United States Patent
Saino et al.

(10) Patent No.: US 7,174,380 B2
(45) Date of Patent: Feb. 6, 2007

(54) COMMUNICATION TERMINAL, SERVICE PROVIDING SYSTEM, SERVICE USE METHOD, STORAGE MEDIUM, AND PROGRAM

(75) Inventors: Yoko Saino, Tokyo (JP); Toyohiko Ushiku, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 09/975,479

(22) Filed: Oct. 11, 2001

(65) Prior Publication Data

US 2002/0055985 A1 May 9, 2002

(30) Foreign Application Priority Data

Oct. 12, 2000 (JP) ............................. 2000-312232

(51) Int. Cl.
*G06F 15/173* (2006.01)
*G06F 15/16* (2006.01)
*G06F 17/30* (2006.01)

(52) U.S. Cl. ...................... 709/226; 709/217; 707/10
(58) Field of Classification Search ................ 709/203, 709/218, 219, 229, 220, 221, 226, 250, 217; 719/330; 707/10; 455/456.1; 370/238
See application file for complete search history.

(56) References Cited

U.S. PATENT DOCUMENTS

| | | | |
|---|---|---|---|
| 6,185,611 B1 * | 2/2001 | Waldo et al. ................ | 709/221 |
| 6,393,497 B1 * | 5/2002 | Arnold et al. ............... | 719/330 |
| 6,426,945 B1 * | 7/2002 | Sengodan .................... | 370/238 |
| 6,446,108 B1 * | 9/2002 | Rosenberg et al. .......... | 709/203 |
| 6,453,350 B1 * | 9/2002 | Factor ......................... | 709/226 |
| 6,477,576 B2 * | 11/2002 | Angwin et al. ............. | 709/226 |
| 6,560,656 B1 * | 5/2003 | O'Sullivan et al. ......... | 719/330 |
| 6,580,916 B1 * | 6/2003 | Weisshaar et al. ....... | 455/456.1 |
| 6,604,140 B1 * | 8/2003 | Beck et al. .................. | 709/226 |
| 6,643,650 B1 * | 11/2003 | Slaughter et al. ............. | 707/10 |
| 6,708,171 B1 * | 3/2004 | Waldo et al. .................. | 707/10 |
| 6,839,757 B1 * | 1/2005 | Romano et al. ............ | 709/226 |
| 6,845,393 B1 * | 1/2005 | Murphy et al. ............. | 709/220 |
| 6,862,594 B1 * | 3/2005 | Saulpaugh et al. ........... | 707/10 |

OTHER PUBLICATIONS

"A Generic Multicast Transport Service to Support Disconnected Operation", by Silvano Maffeis, Walter Bischofberger and Kai-Uwe Mätzel.*
Network Working Group, RFC 2165 "Service Location Protocol", published Jun. 1997.*

* cited by examiner

*Primary Examiner*—Saleh Najjar
*Assistant Examiner*—V. Korobov
(74) *Attorney, Agent, or Firm*—Morgan & Finnegan, LLP

(57) ABSTRACT

Even if a look-up service cannot be searched, services of a service provider can be used while consumption of resources is suppressed. A client issues a multi cast notification if the look-up service cannot be searched. In response to the multi cast notification, the service provider issues a service register request (transmission of a service object) to the transmission originating client. The client temporarily stores the received service object in a memory. A service object not coincident with the attribute information of a desired service is deleted from the memory, and the desired service is used by using an agent object coincident with the attribute information of the desired service. A service search request from another client responding to the multi cast notification is rejected.

12 Claims, 3 Drawing Sheets

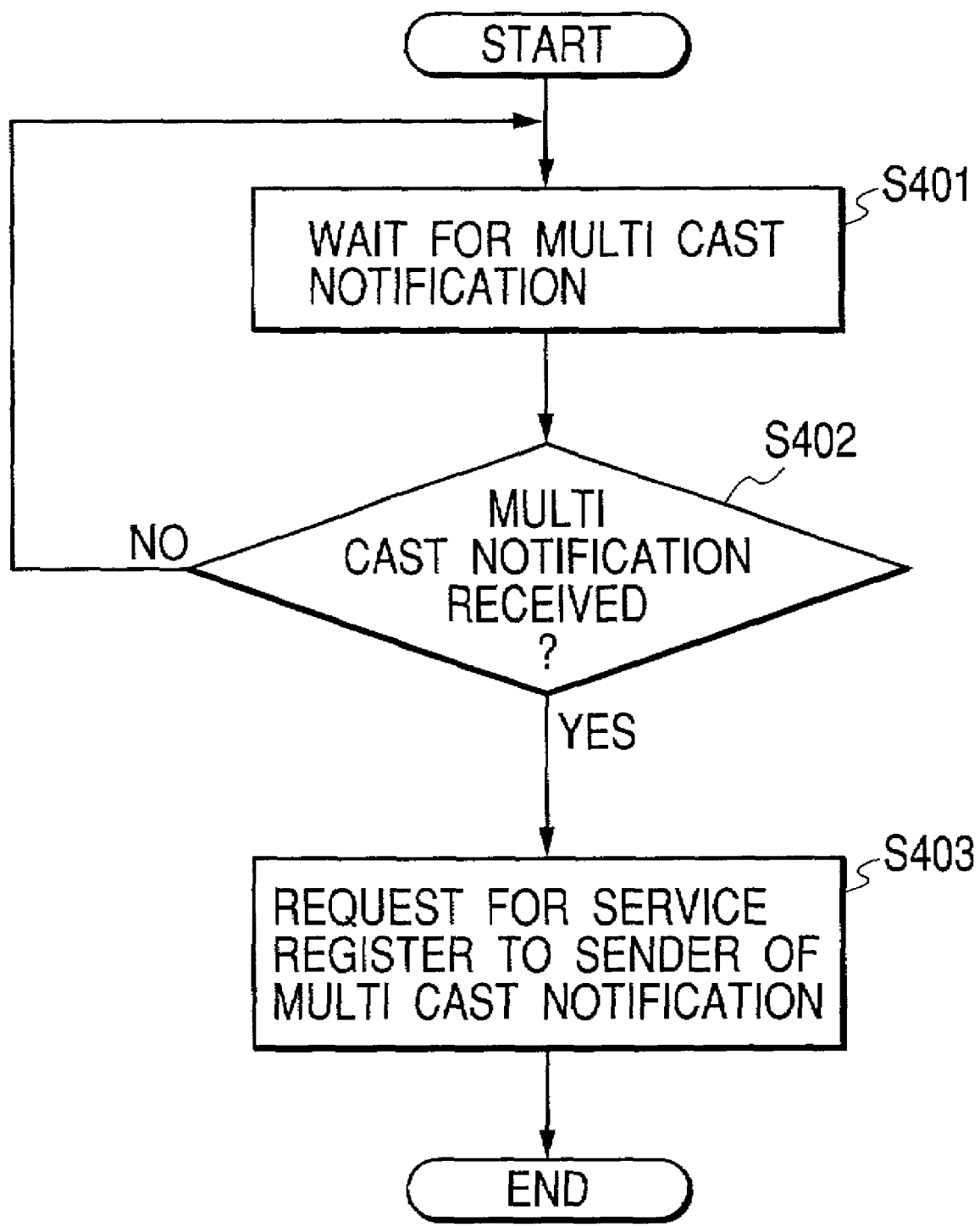

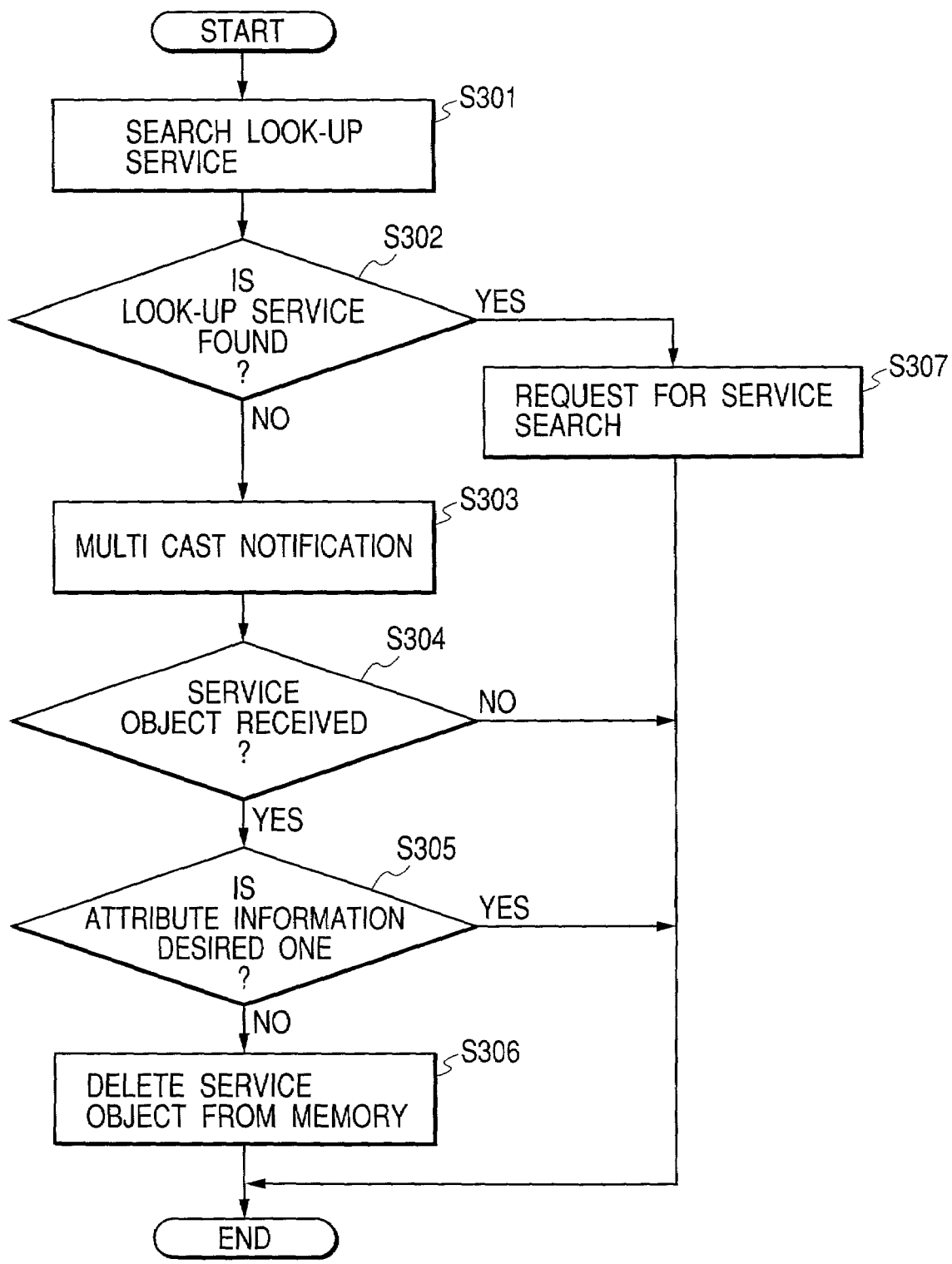

COMMUNICATION TERMINAL, SERVICE PROVIDING SYSTEM, SERVICE USE METHOD, STORAGE MEDIUM, AND PROGRAM

BACKGROUND OF THE INVENTION

1. Field of the Invention

The present invention relates to a communication terminal capable of using services of a service provider even if a look-up service cannot be searched, while consumption of resources is suppressed.

2. Related Background Art

Systems have recently been developed in which various apparatuses can be used together simply by connecting them to a network. In one system, a client as a communication terminal is connected to a service provider and a look-up server via a network, and can use services provided by the service provider.

In this system, the service provider provides its own functions (services). The look-up server registers services to be provided by the service provider, and provides the registered services to the client. When the service provider is connected to the network, it searches a look-up service in the network, and if the look-up service is found, it registers an agent object and attribute information of the service provided by the service provider in the look-up service. A look-up service of the look-up server has a function of storing an agent object which is program codes used by the client for using the service and the attribute information of the service, and provides the client with the registered service by supplying the agent object to the client.

The client intending to use service searches a look-up service in the network to check if a service to be used is registered in the look-up service. If there is the service to be used, the client acquires the agent object of the service from the look-up service, and communicates with the service provider with involvement of the agent object to thereby use the desired service. Such a system includes Jini™ and the like.

Consider, for example, the case that a portable communication terminal transmits data to a printer of a service provider to print it out. In this case, the portable communication terminal corresponds to a client, the printer corresponds to a service provider, and a service provided by the service provider corresponds to a printing service. The portable communication terminal acquires an agent object of a print service from a look-up server to thereby transmit print data to the printer and print it out.

With this system, however, the client cannot use service provided by the service provider if a look-up server providing a look-up service does not exist in the system or if existence of the look-up server providing look-up service cannot be confirmed because of a network failure or the like. Even if a service desired by a client exists on the network, this service cannot be used if the client cannot find the look-up service.

If the look-up service is newly activated on the client or service provider, the service can be used. However, in this case, resources of the apparatuses are consumed considerably.

SUMMARY OF THE INVENTION

It is an object of the invention to solve the above-described conventional problem and provide a communication terminal capable of using services of a service provider even if a look-up service cannot be searched, while the consumption of resources is suppressed, a service providing system, a service use method, and a storage medium and a program.

In order to solve the above problems, the invention provides a communication terminal connected to a service provider for providing services and to a look-up service for registering service objects defining the services of the service provider, via a network, the communication terminal using the services of the service provider by using the service objects, the communication terminal comprising: look-up service search means for searching the look-up service in the network; first acquisition means for acquiring, if the look-up service search means can search the look-up service, a desired service object by checking whether the desired service object is registered in the searched look-up service; transmission request notification means for issuing, if the look-up service search means cannot search the look-up service, a transmission request notification to the service provider in the network via the network in order to request the service provider to transmit a service object; and second acquisition means responsive to the transmission request notification from the transmission request notification means for acquiring a service object transmitted from the service provider without involvement of the look-up service.

A client 103 of the invention issues a multi cast notification if the look-up service 104 cannot be searched. In response to the multi cast notification, the service provider 102 issues a service register request (transmission of a service object) to the transmission originating client 103. The client 103 temporarily stores the received service object in a memory. A service object not coincident with the attribute information of a desired service is deleted from the memory, and the desired service is used by using an agent object coincident with the attribute information of the desired service. A service search request from another client responding to the multi cast notification is rejected.

Other features and advantages of the present invention will become apparent from the following description taken in conjunction with the accompanying drawings, in which like reference characters designate the same or similar parts thereof throughout the figures thereof.

BRIEF DESCRIPTION OF THE DRAWINGS

The accompanying drawings, which are incorporated in and constitute a part of the specification, illustrate embodiments of the invention and together with the description, explain the principles of the invention.

FIG. 2 is a flow chart illustrating a multi cast notification response process to be executed by a service provider.

FIG. 3 is a flow chart illustrating a service object acquisition process to be executed by a client.

DESCRIPTION OF THE PREFERRED EMBODIMENTS

Figure 1:
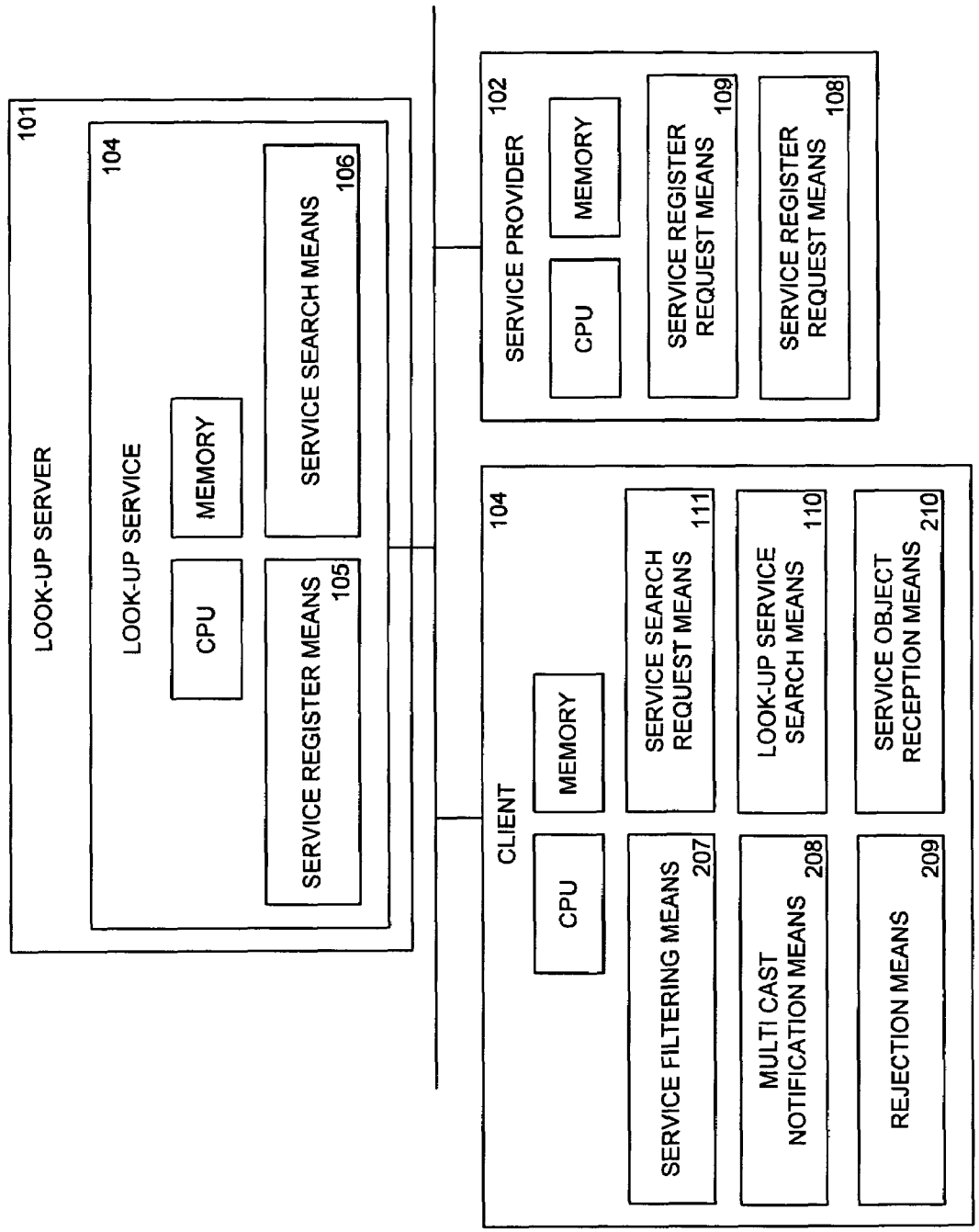
FIG. 1 is a block diagram showing the overall structure of a service providing system according to an embodiment of the invention.

FIG. 1 is a block diagram showing the overall structure of a service providing system according to an embodiment of the invention.

This system is constituted of a look-up server 101, a service provider 102 and a client (communication terminal) 103, respectively connected together via a network. The network has generally a plurality of clients (not shown) having a similar structure to that of the client 103. The network also has generally a plurality of service providers (not shown) having a similar structure to that of the service provider 102 or providing different functions (services) from those of the service provider 102.

The look-up server 101 contains a look-up service 104. The look-up service 104 has functional blocks including a service register means 105 and a service search means 106. The service provider 102 has functional blocks including a look-up service search means 108 and a service register request means 109. The client 103 has functional blocks including a look-up service search means 110, a service search request means 111, a service filtering means 207, a multi cast notification means 208, rejection means 209 and service object reception means 210. These functional blocks are realized by unrepresented CPU's, RAM's, ROM's, control programs and the like of the look-up server 101, service provider 102 and client 103.

In this system, services provided by the service provider 102 can be used simply by connecting the client 103 to the network. For example, if the client 103 is a communication terminal such as a portable "note type personal computer" and the service provider 102 is a "printer", then the system provides a "printing" service. The look-up service 104 is a service having a function of storing an agent object which is program codes to be used when the client 103 uses service of the service provider 102, and attribute information of the service.

In order that the client 103 receives a service of the service provider 102 over the network, the service provider 102 first searches the look-up service 104 of the look-up server 101 which is a registration destination of the agent object as an interface to be used when the client 103 uses the service of the service provider 102, and of the attribute information of the service (e.g., a service name, the apparatus type name of the service provider providing services, and a manufacture company of the service provider, or the like).

In searching the look-up service 104, the look-up service search means 108 is used. After the look-up service 104 is found, by using the service register request means 109, the service provider 102 requests the look-up service 104 to register the agent object and service attribute information. The agent object and service attribute information are collectively called a "service object".

The look-up service 104 stores the service object in a registry of the look-up server 101.

When the client 103 desires to use a service provided by the service provider, the client 103 first searches the look-up service 104 by using the look-up service search means 110. After the look-up service 104 is found, in order to search the desired service, by using the service search request means 111 the client 103 requests the look-up service 104 to check whether there is the agent object having the attribute information of the desired service. If the desired service exists in the registry of the look-up server 101, the look-up service 104 supplies a copy of the agent object to the client 103. By using the supplied agent object, the client 103 directly communicates with the service provider 102 to receive the service.

As will be later described, the multi cast notification means 208 of the client 103 multiply casts a notification to the network, the notification urging the service provider 102 to pass the service object to the client 103. The service filtering means 207 discards an unnecessary service object transmitted from the service provider 102 in response to the multi cast notification, to thereby acquire only the desired service object.

A multi cast notification from the look-up server 101 is issued in order to notify the service provider 102 and client 103 on the network of that the look-up service 104 becomes available after it is activated. Upon reception of this multi cast notification, the service provider 102 transmits a service object to the activated look-up service 104 from which the multi cast notification was transmitted, and requests the look-up service 104 to register the service object. On the other hand, upon reception of this multi cast notification, by using the service search request means 111 the client 103 transmits a service search request to the look-up service 104 from which the multi cast notification was transmitted. The service search request is a request to search whether a desired service is registered, and if the service is found, to transmit the service object of the service.

In this embodiment, the client 103 has also the function of transmitting a multi cast notification, as will be detailed later. After the client 103 transmits the multi cast notification, the service provider 102 transmits the service object to the client 103 from which the multi cast notification was transmitted. Another client erroneously considers that the look-up service 104 was activated, and transmits the service search request to the client 103 from which the multi cast notification was transmitted. The countermeasure against this will be described later.

In this embodiment, in the service providing system, even if the look-up service 104 does not exist in the area where the client 103 can search it or even if the look-up service 104 cannot be searched by a network failure or the like, the desired service can be used if the service exists in the network. This will be described hereinafter.

FIG. 2 is a flow chart illustrating a multi cast notification response process to be executed by the service provider 102.

First, the service provider 102 intending to use the look-up service 104 waits for a multi cast notification from the look-up service 104 (Step S401), and it is judged whether the multi cast notification was received from the look-up service 104 (Step S402). If it is judged that the multi cast notification is not received, the flow returns to Step S401, whereas if received, the flow advances to Step S403.

At Step S403, by using the service register request means 109 the service provider 102 issues a service register request to the transmission originating site of the multi cast notification. Namely, together with the multi cast notification from the look-up service 104, the host name, host port information and the like of the look-up service 104 to which a service object of the service provider 102 is transmitted, are transmitted. In accordance with this information, the service provider 102 transmits its service object to the look-up service 104 to request registration of the service object. Thereafter, this process is terminated.

As described earlier, the multi cast notification is generally executed by the look-up service 104. Therefore, the service object is generally transmitted at Step S403 to the look-up service 104. If the client 103 desires to use service of the service provider 102, it first searches the look-up service 104. If the look-up service 104 cannot be found, the client 103 transmits a multi cast notification to the network, as will be later described. In this case, upon reception of the multi cast notification from the client 103, the service provider 102 receives the host name and port information of the transmission originating client 103. Therefore, the service provider 102 received the multi cast notification from the client 103 issues at Step S403 a service register request to the client 103. Namely, in accordance with the received host name and port information, the service provider 102 transmits the service object to the transmission originating client 103. In this case, the service object is transmitted directly to the client 103 without involvement of the look-up service 104.

FIG. 3 is a flow chart illustrating a service object acquisition process to be executed by the client 103.

First, by using the look-up service search means 110, the client 103 searches the look-up service 104 (Step S301), and judges whether the look-up service 104 was able to be searched (found) (Step S302). If it is judged that the look-up service 104 is found, by using a service search request, i.e., by using the service search request means 111, the client 103 transmits the attribute information of the desired service to the look-up service 104 and waits for the reception of a search result (Step S307).

Further, if the service coincident with the attribute information of the desired service exists in the look-up service 104, this service object is transmitted from the look-up service 104. Therefore, by using the agent object contained in the service object, the service provided by the service provider 102 can be used.

If it is judged at Step S302 that the look-up service 104 was not able to be searched, by using the multi cast notification means 208 a multi cast notification is transmitted (Step S303). This notification requests the service provider 102 to transmit the service object.

Next, it is judged whether the service object was received from the service provider 102 responded to the multi cast notification (Step S304). If at Step S403 shown in FIG. 2, the service provider 102 issues the service register request to the client 103, the service object is received by the client 103. The received service object is temporarily stored in a memory (not shown) of the client 103.

If it is judged at Step S304 that a service object is not received from the service provider 102, it is judged that the desired service does not exist, and the process is terminated.

If a service object is received from the service provider 102, by using the service filtering means 207 it is judged whether the attribute information of the received service object is coincident with that of the desired service (Step S305). Namely, the attribute information of the received service object is confirmed and compared with the preset attribute information of the desired service. If the attribute information is coincident with the preset attribute information, it is judged that the service object is coincident with that of the desired service.

If it is judged that the attribute information of the received service object is coincident with that of the desired information, then by using the agent object in the service object corresponding to the desired attribute information, the service of the service provider 102 can be used.

If it is judged at Step S305 that the attribute information of the received service object is not coincident with that of the desired service, the service object is deleted from the unrepresented memory (Step S306) to thereafter terminate the process. In this manner, an unnecessary service object can be removed and only a desired service can be efficiently used. As described earlier, when a multi cast notification is issued from the client 103, another client issues a service search request to the transmission originating client 103. In order to avoid this, at Step S305 the service filtering means 207 rejects the service search request from the other client. In this manner, the service search request from another client is not received and a wasteful process can be prevented from being executed.

If it is judged at Step S305 that the attribute information of all received service objects is not coincident with that of the desired service, the service objects are deleted from the memory (Step S306) and it is judged that the desired service does not exist, to thereafter terminate the process.

According to the embodiment, even if the look-up service does not exist or even if the look-up service cannot be used by a network failure or the like, the client 103 issues a multi cast notification and receives a service object from the service provider 102 responding to the multi cast notification, so that the desired service can be used if the service exists in the network. The system concentrates upon acquisition of only a desired service. Without newly activating a look-up service on the client 103 or service provider 102, the services provided by the service provider 102 can be used and resources of the apparatuses are prevented from being consumed too much. Accordingly, even if the look-up service cannot be searched, services of the service provider can be used while consumption of resources is suppressed.

In the embodiment, although a printer is illustratively used as the service provider 102, the service provider is not limited only thereto, but other service providers providing other functions such as a facsimile may also be used. The client 103 is not limited only to a personal computer, but it may be other communication terminals.

For example, all or some of the client, look-up server and service provider may be computers. For example, the computer is constituted of: a CPU for executing actual arithmetic and logical operations; a RAM used as a working area for reading a program; a storage medium for storing a program for executing processes corresponding to the flow charts shown in FIGS. 2 and 3 and various data, (such as hard disk, ROM, and removable disk (floppy disk, CD-ROM, etc)); a keyboard and a pointing device for various operations; a display for displaying processed results; a network interface for connection to a network; and the like.

It is obvious that the object of the invention can be achieved by supplying a storage medium storing software program codes for realizing the embodiment functions to the service providing system, and making each computer (CPU or MPU) of the system read and execute the program codes stored in the storage medium.

In this case, the program codes themselves read from the storage medium realize the novel functions of the invention. Therefore, the storage medium storing the program codes constitute the present invention.

The storage medium for storing such program codes may be a floppy disk, a hard disk, an optical disk, a magneto optical disk, a CD-ROM, a CD-R, a magnetic tape, a nonvolatile memory card, a ROM or the like.

It is obvious that the scope of the invention contains not only the case that a computer executes the read program codes to realize the embodiment functions but also the case that an OS or the like running on the computer performs a portion or the whole of actual processes in accordance with the program codes, to thereby realize the embodiment functions.

It is obvious that the scope of the invention also contains the case wherein the embodiment functions can be realized by writing the program codes into a memory of a function expansion board inserted into a computer or of a function expansion unit connected to the computer, and thereafter by executing a portion or the whole of actual processes by a CPU or the like of the function expansion board or function expansion unit in accordance with the program codes.

As described so far, according to the invention, even if a look-up service cannot be searched, services of the service provider can be used while consumption of resources is suppressed.

What is claimed is:

1. A communication terminal connected to, via a network, a plurality of service providers and to a look-up service that registers a plurality of service objects defining services provided by the plurality of service providers, where the communication terminal uses the services of the service provider by using the service objects, the communication terminal comprising:

look-up service search means for searching the look-up service in the network;

determining means for determining whether said look-up service search means can search the look-up service;

first acquisition means for acquiring, if said determining means determines that said look-up service search means can search the look-up service, a desired service object from the searched look-up service by transmitting a service search request to the look-up service and receiving the desired service object, which is searched based on the service search request in the searched look-up service, from the look-up service;

multicast notification means for issuing, if said determining means determines that said look-up service search means cannot search the look-up service, a multicast notification to the network in order to request the plurality of service providers to transmit respective service objects; and second acquisition means for receiving a plurality of service objects from the plurality of service providers, the plurality of service objects being transmitted from the plurality of service providers responsive to the multicast notification issued by said multicast notification means, and acquiring a desired service object from among the plurality of received service objects, wherein said second acquisition means rejects a service search request transmitted from another client's apparatus responsive to the multicast notification issued by said multicast notification means.

2. A communication terminal according to claim 1, wherein when one of the plurality of service providers receives a multicast notification from a transmission originating site, the service provider transmits the service object of the service provider to the transmission originating site in order to register the service object in the transmission originating site.

3. A communication terminal according to claim 2, wherein the look-up service issues the multi cast notification to the network, and registers the service object transmitted from the service provider responding to the multi cast notification.

4. A communication terminal according to claim 1, wherein said second acquisition means acquires the desired service object by deleting a service object other than the desired service object, among the plurality of received service objects.

5. A communication terminal according to claim 1, wherein the service object includes an agent which is program codes for using each service of the service provider, and attribute information of the service.

6. A service providing system in which a plurality of service providers and a look-up service that registers a plurality of service objects defining services provided by the plurality of service providers are connected to a communication terminal via a network where the communication terminal uses the services of the service provider by using the service objects, the communication terminal comprises:

look-up service search means for searching the look-up service in the network;

determining means for determining whether said look-up service search means can search the look-up service;

first acquisition means for acquiring, if said determining means determines that said look-up service search means can search the look-up service, a desired service object from the searched look-up service by transmitting a service search request to the look-up service and receiving the desired service object, which is searched based on the service search request in the searched look-up service, from the look-up service;

multicast notification means for issuing, if said determining means determines that said look-up service search means cannot search the look-up service, a multicast notification to the network in order to request the plurality of service providers to transmit respective service objects; and second acquisition means for receiving a plurality of service objects from the plurality of service providers, the plurality of service objects being transmitted from the plurality of service providers responsive to the multicast notification issued by said multicast notification means, and acquiring a desired service object from among the plurality of received service objects, wherein said second acquisition means rejects a service search request transmitted from another client's apparatus responsive to the multicast notification issued by said multicast notification means.

7. A method of using a service of a plurality of service providers by using a plurality of service objects provided by the plurality of service providers, where a communication terminal is connected, via a network, to the plurality of service providers and to a look-up service that registers a plurality of service objects defining services provided by the plurality of service providers, the method comprising:

a look-up service search step of searching the look-up service in the network;

a determining step of determining whether said look-up service search step can search the look-up service;

a first acquisition step of acquiring, if said determining means determines that said look-up service search step can search the look-up service, a desired service object from the searched look-up service by transmitting a service search request to the look-up service and receiving the desired service object, which is searched based on the service search request in the searched look-up service, from the look-up service;

a multicast notification step of issuing, if said determining means determines that said look-up service search step cannot search the look-up service, a multicast notification to the network in order to request the plurality of service providers to transmit respective service objects; and a second acquisition step for receiving a plurality of service objects from the plurality of service providers, the plurality of service objects being transmitted from the plurality of service providers responsive to the multicast notification issued by said multicast notification means, and acquiring a desired service object from among the plurality of received service objects, wherein said second acquisition means rejects a service search request transmitted from another client's apparatus responsive to the multicast notification issued by said multicast notification means.

8. A service use method according to claim 7, wherein when one of the plurality of service providers receives a multicast notification from a transmission originating site, the service provider transmits the service object of the service provider to the transmission originating site in order to register the service object in the transmission originating site.

9. A service use method according to claim 8, wherein the look-up service issues the multi cast notification to the network, and registers the service object transmitted from the service provider responding to the multi cast notification.

10. A service use method according to claim 7, wherein said second acquisition step acquires the desired service object by deleting a service object other than the desired service object, among the plurality of received service objects.

11. A service use method according to claim 7, wherein the service object includes an agent which is program codes used for using each service of the service provider, and attribute information of the service.

12. A storage medium storing a computer readable program for using a service of a plurality of service providers by using a plurality of service objects provided by the plurality of service providers, where a communication terminal is connected, via a network, to the plurality of service providers and to a look-up service that registers service objects defining the services provided by the plurality of service providers, said computer readable program comprising codes for executing steps including:

a look-up service search step of searching the look-up service in the network; a determining step of determining whether said look-up service search step can search the look-up service;

a first acquisition step of acquiring, if said determining means determines that said look-up service search step can search the look-up service, a desired service object from the searched look-up service by transmitting a service search request to the look-up service and receiving the desired service object, which is searched based on the service search request in the searched look-up service, from the look-up service;

a multicast notification step of issuing, if said determining means determines that said look-up service search step cannot search the look-up service, a multicast notification to the network in order to request the plurality of service providers to transmit respective service objects; and a second acquisition step for receiving a plurality of service objects from the plurality of service providers, the plurality of service objects being transmitted from the plurality of service providers responsive to the multicast notification issued by said multicast notification means, and acquiring a desired service object from among the plurality of received service objects, wherein said second acquisition means rejects a service search request transmitted from another client's apparatus responsive to the multicast notification issued by said multicast notification means.

* * * * *